(12) United States Patent
Lowry et al.

(10) Patent No.: US 7,575,355 B2
(45) Date of Patent: Aug. 18, 2009

(54) APPARATUS FOR ILLUMINATING CHANNEL LETTERS AND LIGHT BOXES

(75) Inventors: Brian C. Lowry, Emlenton, PA (US); David Sheffield, Virginia Beach, VA (US); Clark Shotwell, Bonita Springs, FL (US)

(73) Assignee: Megapull, Inc., Mooresville, NC (US)

( * ) Notice: Subject to any disclaimer, the term of this patent is extended or adjusted under 35 U.S.C. 154(b) by 0 days.

(21) Appl. No.: 11/699,219

(22) Filed: Jan. 27, 2007

(65) Prior Publication Data

US 2007/0195547 A1 Aug. 23, 2007

Related U.S. Application Data

(60) Provisional application No. 60/763,118, filed on Jan. 27, 2006, provisional application No. 60/763,119, filed on Jan. 27, 2006.

(51) Int. Cl.
*G02B 6/00* (2006.01)
(52) U.S. Cl. ....................... 362/551; 362/559
(58) Field of Classification Search ........ 362/551, 362/555, 560, 565–566, 252, 249, 812, 554, 362/559, 567–568
See application file for complete search history.

(56) References Cited

U.S. PATENT DOCUMENTS

| 4,529,193 | A | * | 7/1985 | Kuhnsman | ............. 482/1 |
| 5,301,090 | A | | 4/1994 | Hed | |
| 6,024,476 | A | | 2/2000 | Wakeman | |
| 6,030,089 | A | | 2/2000 | Parker et al. | |
| 6,123,442 | A | | 9/2000 | Freier et al. | |
| 6,299,338 | B1 | | 10/2001 | Levinson et al. | |
| 6,402,347 | B1 | | 6/2002 | Maas et al. | |
| 6,510,277 | B1 | * | 1/2003 | Dongo | ............. 385/147 |
| 6,957,905 | B1 | | 10/2005 | Pritchard et al. | |
| 2002/0145865 | A1 | * | 10/2002 | Gregg | ............. 362/106 |
| 2003/0112639 | A1 | | 6/2003 | Stack | |
| 2003/0182833 | A1 | * | 10/2003 | Lewis | ............. 40/551 |

(Continued)

FOREIGN PATENT DOCUMENTS

EP 0800036 A 10/1997

(Continued)

OTHER PUBLICATIONS

International Search Report from International Application No. PCT/US1007/002450 dated Jul. 20, 2007.

*Primary Examiner*—Jong-Suk (James) Lee
*Assistant Examiner*—Julie A Shallenberger
(74) *Attorney, Agent, or Firm*—Ference & Associates LLC

(57) ABSTRACT

A channel letter or light box illumination apparatus wherein the channel letter or light box is illuminated from a luminaire located at some distance from the channel letter or light box, ideally in a location expeditious to servicing replaceable components such as lamps and driver electronics. A light engine includes one or more light ports, with each port capable of conveying light via optical light guides for the purpose of illuminating a portion or entirety of the light box or channel letter. A singular light guide or plurality of light guides enters the side or rear of the channel letter or light box and are coupled to side-lit light guides. The side-lit light guides, which may be bent and formed, convey light and distribute it through out the channel letter or light box.

16 Claims, 3 Drawing Sheets

U.S. PATENT DOCUMENTS

| | | |
|---|---|---|
| 2004/0228144 A1 * | 11/2004 | Squicciarini ................ 362/555 |
| 2004/0250457 A1 | 12/2004 | Strein et al. |
| 2005/0084229 A1 * | 4/2005 | Babbitt et al. ............... 385/146 |
| 2005/0285547 A1 | 12/2005 | Piepgras et al. |
| 2006/0050527 A1 | 3/2006 | Rehberger et al. |
| 2006/0123678 A1 | 6/2006 | Arvin |

FOREIGN PATENT DOCUMENTS

| | | |
|---|---|---|
| JP | 03296089 | 12/1991 |
| WO | WO 99/22174 A | 5/1999 |

* cited by examiner

APPARATUS FOR ILLUMINATING CHANNEL LETTERS AND LIGHT BOXES

CROSS-REFERENCE TO RELATED APPLICATION

This application claims priority from U.S. Provisional Patent Application Ser. Nos. 60/763,118 and 60/763,119, both of which were filed on Jan. 27, 2006, and entitled, respectively, "Apparatus for Remotely Illuminating Channel Letters and Light-Boxes" and "Apparatus for Illuminating Channel Letters and Light Boxes", the contents of which are hereby fully incorporated by reference.

FIELD OF THE INVENTION

The present invention relates to lighting apparatus, such as in the context of large-scale signing, and to specific arrangements of light provision and distribution sources.

BACKGROUND OF THE INVENTION

Traditionally, in the signing industry, particularly in connection with large illuminated signs as may be used in advertising or in appending large, illuminated labels to buildings, channel letters and light boxes have become standards. Typically, they have been illuminated internally with neon and fluorescent tubes, incandescent lamps, and more recently with light emitting diode (LED) technology. All of these technologies require the use of transformers, driver electronics, and electrical contacts to be located in the channel letter or light box "can", or holding structure, which may normally have metal sides and a translucent plastic face. In many instances, channel letter signs and light boxes are located in places that are not easy to access, for example, at the top of a multi-story building. Thus, replacing serviceable parts and repairing malfunctioning components can be time-consuming, costly in terms of labor and equipment, and potentially dangerous. A compelling need has thus been recognized in connection with illuminating channel letter signage and light boxes in a manner to permit serviceable components to be located in locations that are easy to access.

Fiber optic technology has provided many advantages in a variety of contexts and has been contemplated previously in connection with lighting applications. End-lit fibers emit light at terminal ends of fibers while very little light typically is emitted through the cylindrical fiber walls. U.S. Pat. No. 6,024,476 relates to the use of "end-lit" fibers in lighting. There, bunches of end-lit fibers are grouped together to create an aggregately much greater light output than is possible with a single end-lit fiber. Apart from the intricacies encountered in connection with bunching the fibers together, they are prone to easy breakage when bunched and difficult to maintain or replace. Moreover, retrofitting an existing channel letter in the manner taught by this patent would be impractical.

"Side-lit" fibers, in contrast, emit light isotropically through the cylindrical walls of a fiber, that is, outwardly along an infinite number of radial directions as defined with respect to a central longitudinal axis of the fiber. U.S. Pat. No. 6,123,442 describes the use of side-lit fibers in lighting. However, it has been found that the light provided by such fibers is often inconsistent and unpredictable, especially when intricate configurations (e.g. of letters or numerals) are contemplated. Also, maintenance is difficult and costly in that entire lengths of fiber often need to be replaced even in the case of minor performance issues. Moreover, since side lit fiber is designed to lose or emit light along its length, as the distance between the light engine and the channel letter is increased, the useable light in the can is proportionally diminished.

In view of the foregoing, a general need has been recognized in connection with providing a cost-effective lighting arrangement that employs versatile technology such as fiber optics but improves upon the shortcomings hitherto encountered with such technology.

SUMMARY OF THE INVENTION

Broadly contemplated herein, in accordance with at least one presently preferred embodiment of the present invention, are unique manners of combining the advantages of end-lit and side-lit fibers, or functional equivalents of either, to afford a lighting arrangement that is effective, uniform in appearance, and easy to maintain. Particularly, there is broadly contemplated herein the use of side-lit fibers for distributing light along with one or more end-lit fibers that direct light from a "light engine" to the side-lit fibers. One or more end-lit fibers may preferably be connected to a side-lit fiber at either or both ends of the latter. Multiple side-lit fibers may be arranged linearly to aggregately result in a larger side-lit fiber "complex", wherein end-lit fibers may feed into either or both ends of-each of the side-lit fibers.

In summary, one aspect of the invention provides an apparatus for providing illumination, the apparatus comprising: a primary illumination element; and a light provision conduit connected to the primary illumination element; the light provision conduit acting to propagate light towards the primary illumination element at an end of the light provision conduit; the primary illumination element being disposed in accordance with a predetermined pattern; the primary illumination element acting to provide illumination in directions outwardly from the predetermined pattern.

Furthermore, an additional aspect of the invention provides an apparatus for providing illumination, the apparatus comprising: a light engine element; a primary illumination element; and a light provision conduit interposed between the light engine element and the primary illumination element; the light provision conduit acting to propagate light towards the primary illumination element at an end of the light provision conduit; the primary illumination element being disposed in accordance with a predetermined pattern; the primary illumination element acting to provide illumination in directions outwardly from the predetermined pattern.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
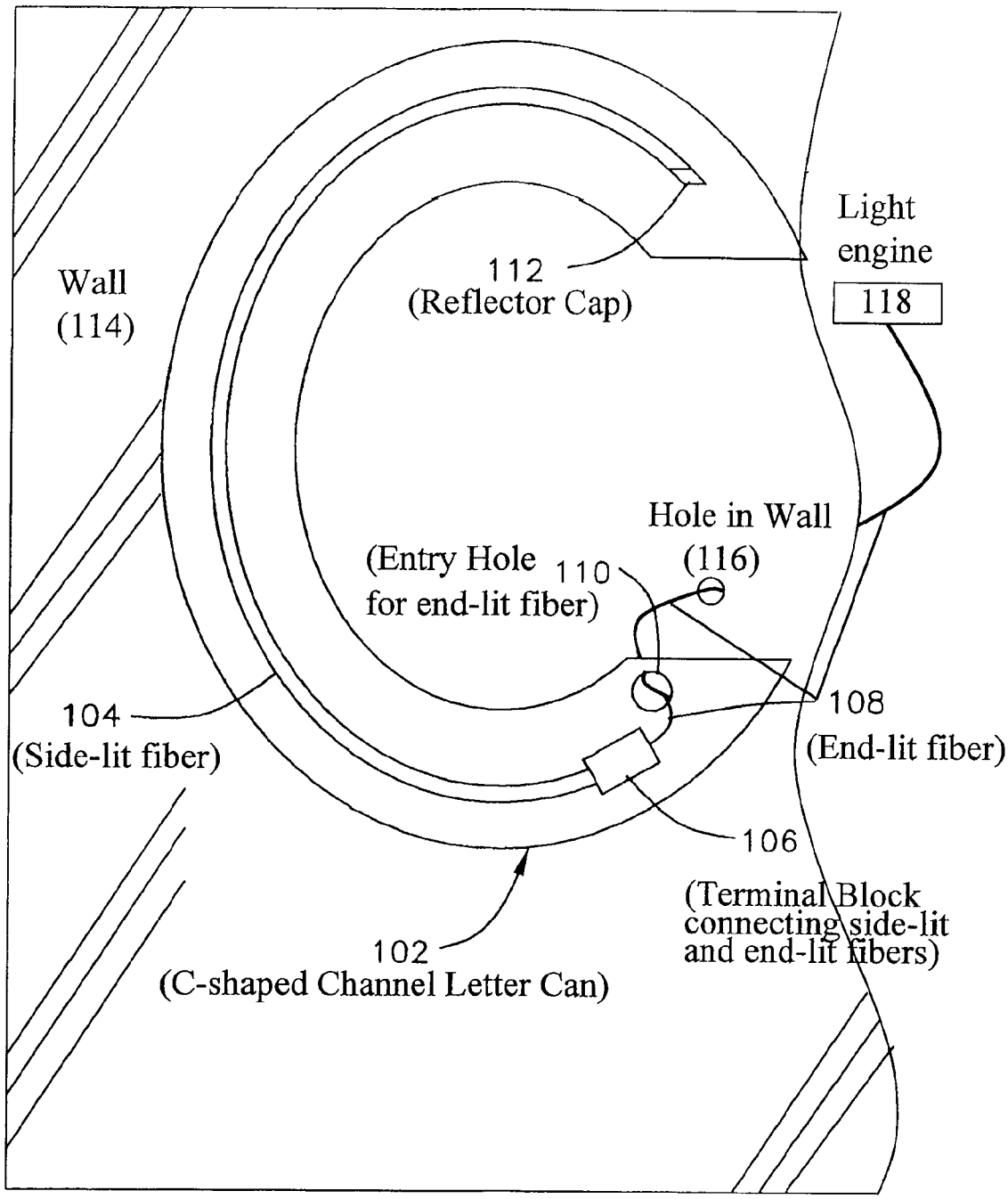
FIG. 1 shows a channel letter assembly with constituent components.
Figure 2:
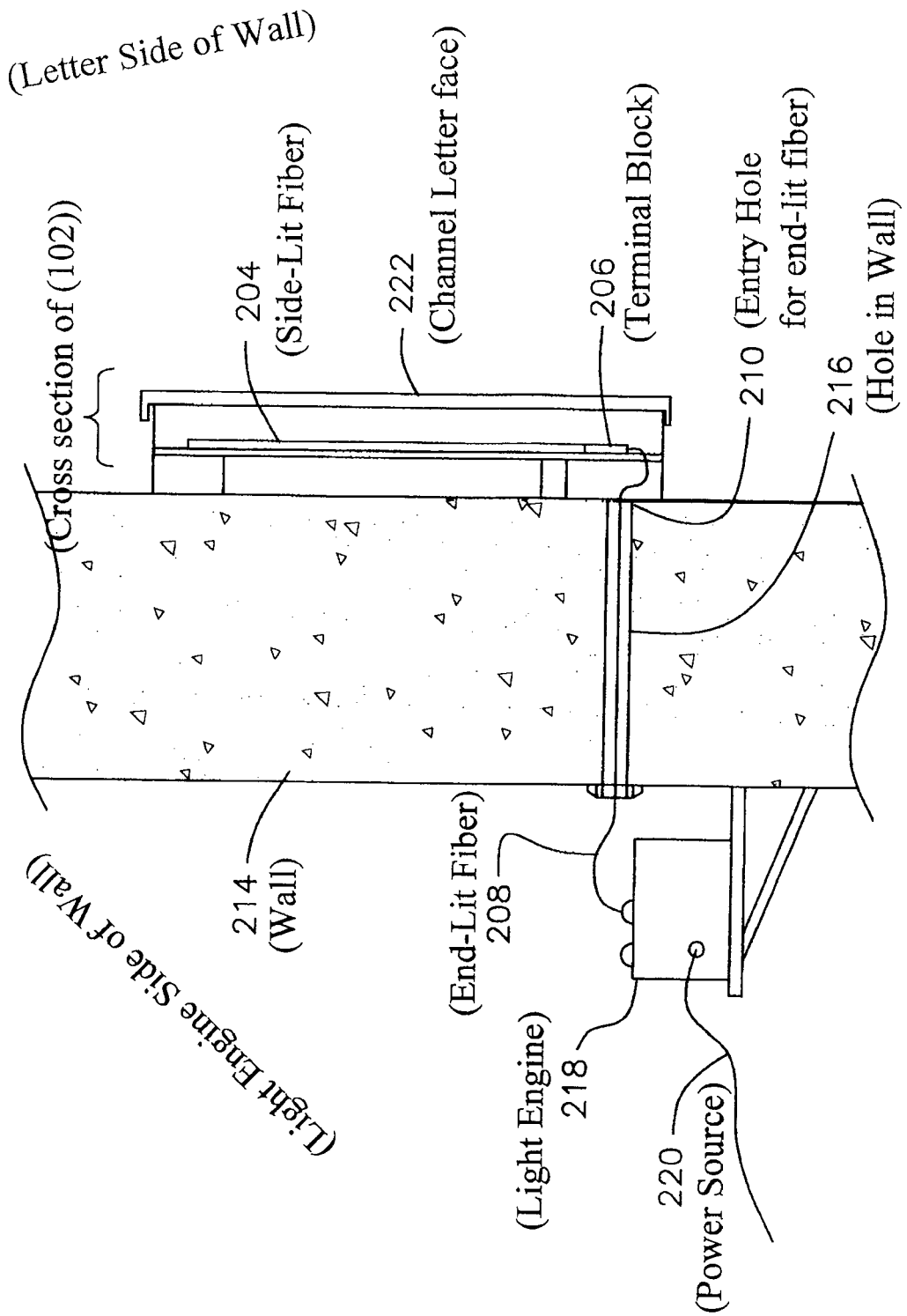
FIG. 2 is a side cross-sectional view of a channel letter assembly with a light engine.
Figure 3:
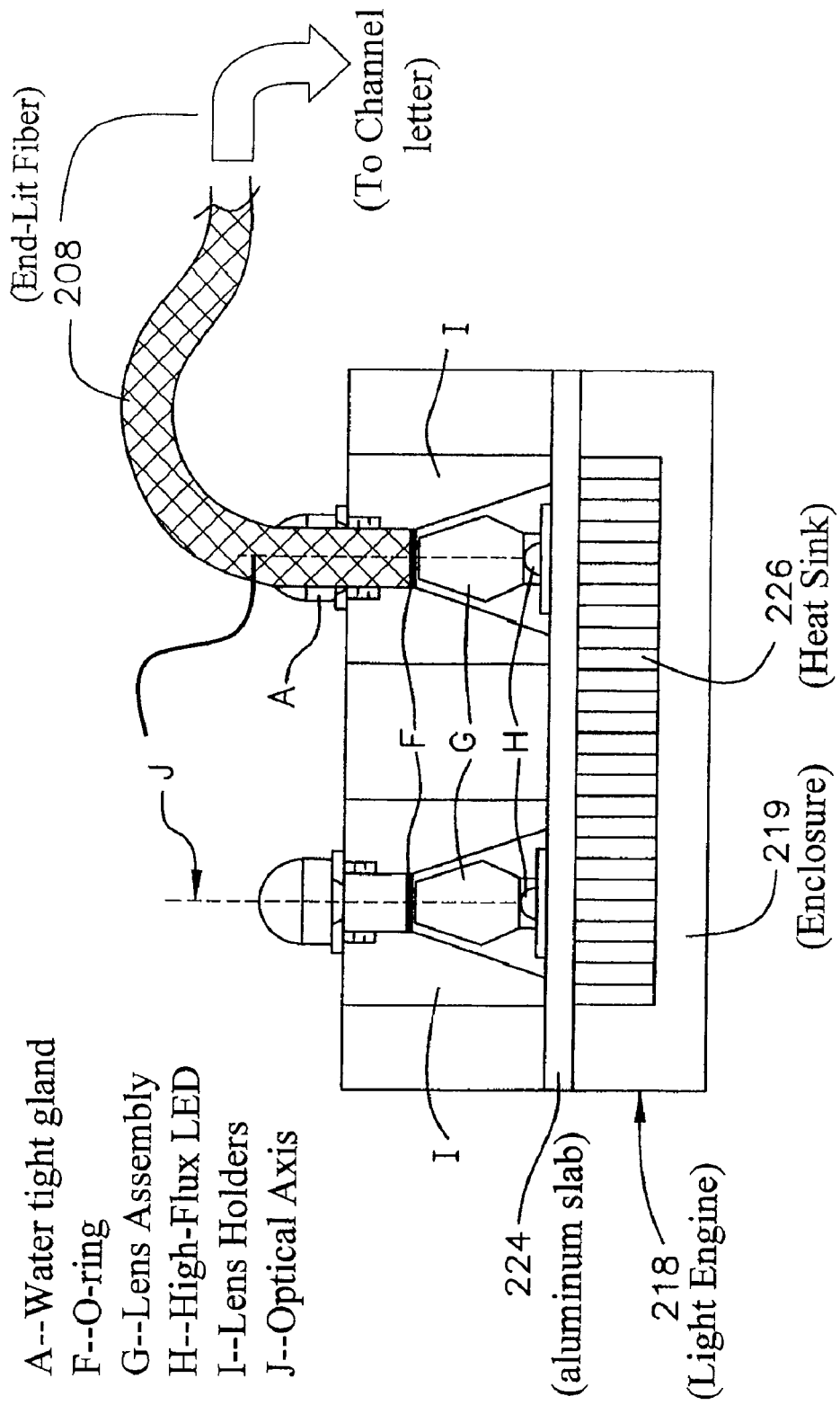
FIG. 3 shows details of a light engine from FIG. 2.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

In accordance with a preferred embodiment of the present invention, as shown in FIG. 1, a channel letter "can" 102, here in the shape of a letter "C", is configured to hold a side-lit fiber 104. The channel letter can 102 is depicted as mounted on a wall 114. Preferably, a light guide 108 in the form of an end-lit fiber will enter can 102 through an entry hole 110 in the channel letter can 102 to connect to one end of the side-lit fiber 104 via a terminal block 106 (to be described more fully below). The end-lit fiber 108 delivers light from a light engine 118 through a hole in the wall 116 to the channel letter can 102 (described further below with reference to FIG. 2). As shown, a reflective cap 112 can preferably be provided at the other end of side-lit fiber 104 to reflect light back through the side-lit fiber that has already progressed through side-lit fiber 104. Alternatively, the reflector cap e could be replaced by a second terminal block similar to 106 into which feeds a second end-lit fiber similar to 108 (not shown). The reflective material within the reflector cap 112 is preferably a material with specular reflective properties, such as a highly polished die-cut Aluminum disc.

By way of sample dimensions, end-lit fiber 108 may have a diameter ranging from 5 to 7 mm while side-lit fiber 112 may have a diameter in the range of 10 mm to 14 mm, or approximately twice the diameter of the end-lit fiber. An example of a suitable end-lit fiber would be the "Super Side Light" fiber produced by Poly Optics Australia Pty Ltd of Burleigh, Qld., Australia.

Terminal block 106 is preferably configured so as to snugly and efficiently accommodate respective ends of side-lit fiber 104 and end-lit fiber 108 (and thus accommodate the likely mismatch in diameter between fibers 104 and 108). Maximal light transmission is accomplished by axially aligning the end-lit and side-lit fiber terminals. Preferably, the fiber ends are cleaved at right angles to the longitudinal axis of light propagation to ensure an optimal butt fit. Terminal block 106 itself is preferably formed from a translucent thermoplastic material such that light can emit from it as well and thus prevent any type of "dead spot" with regard to the aggregate light emanating from can 102. Essentially any suitable form-fit or interference fit between respective ends of the fibers 104/108 and block 106 may be employed. (For instance, an interference fit could employ dimples, or a notch and groove, or any of a wide variety of interference fit connections as commonly known.)

The block 106 itself can preferably be custom-made for the fibers 104/108 in question and in any case can be very easily formed. For instance, block 106 could be embodied by an injection-molded component (formed from resin). Alternatively, it could be formed from an initial block of material that is subsequently cut to length and formed as needed. As but one example among many, McMaster-Carr Supply Co. of Los Angeles provides suitable bars of translucent thermoplastic material for this purpose.

As contemplated above, one light engine, which feeds into a side-lit fiber 104 via an end-lit fiber 108, can be provided to illuminate an entire letter as shown in FIG. 1. In such a case, the reflector cap 112 helps multiply the effect of this single light engine. Alternatively, reflector cap 112 could be replaced by yet another terminal block which connects to an end-lit fiber emanating from another light engine. Such an arrangement would create a stronger overall light output than that shown in FIG. 1.

It is possible to provide an even greater number of end-lit fibers feeding into a side-lit fiber. For instance, a letter such as that shown in FIG. 1 could be lit by a plurality of segments of side-lit fiber that are linearly arranged end-to-end with respect to one another to form the full letter. Terminal blocks at one or more ends of each of such segments can interconnect each such segment with a corresponding end-lit fiber. As with the embodiment shown in FIG. 1, each such segment can have a reflector cap at a second end of the segment, or could be provided alternatively with another terminal block which interconnects with yet another end-lit fiber. It will be appreciated that in any of the "multiple segment" scenarios just described, a greater number of segments will typically result in a greater overall light output for the letter (or other larger element) in question; thus, particularly large sign assemblies may well warrant a "multiple segment" approach.

FIG. 2 shows a side cross-sectional view of a channel letter arrangement in accordance with a possible application. In general, FIG. 2 depicts a channel letter (e.g. such as 102 of FIG. 1) mounted on a wall 214 opposite the light engine 218. The view shown is a cross section of the letter 102 and wall 214 with a remotely located light engine 218. As shown, channel letter face 222 (typically a plastic face on a channel letter can such as that indicated at 102 in FIG. 1) encases a side-lit fiber 204 as discussed above. As also discussed above, an end-lit fiber 208 preferably feeds into a terminal block 206 at one end of the side-lit fiber 204. In the application shown in FIG. 2, a wall 214 intervenes between the light engine 218 and channel letter assembly. Preferably, end-lit fiber 208 interconnects light engine 218 and side-lit fiber 204 (via terminal block 206) through a conduit or bore 216 in wall 214 (terminating at hole 210). Indicated at 220 is a suitable power source for light engine 218.

FIG. 3 shows details of a light engine that may be employed as the light engine shown at 218 in FIG. 2, though of course a very wide variety of substitutes are possible. As shown, enclosure 219 of the light engine assembly 218 includes therewith a pair of lens holders i, out of one of which an end-lit fiber 208 is shown to extend. Another end-lit fiber 208 can be attached to another lens holder i to run to another letter can (not shown) so as to provide another light source (e.g. one per letter can).

A suitable light source such as a high-flux LED h is configured to emit light into a collimating lens g and then into end-lit fiber 208. An O-ring f may be employed to secure the collimating lens assembly g within the lens holder i and to provide ingress protection from moisture and other contaminants. As is well-known, an aluminum slab 224 may be provided to support the lens holders i, and a heat sink 226 may be provided under slab 224. Components f, g and h are preferably centered about an optical axis j (shown on the left). Further, on each side, a water-tight gland a is preferably provided to surround and seal an end-lit fiber such as 208 as the latter enters the enclosure 219.

It should be understood that the embodiments of the present invention, as broadly described and contemplated herein, need not be restricted to channel letter or light box arrangements. In point of fact, there are a very wide variety of alternative applications, such as the use of straight strands of fiber optic cable, preferably in an appropriate channel, box or other mounting medium, in illuminating spaces that are normally dark and difficult to access, such as the interior of fluid storage tanks, underneath countertops, bookshelves, and in a very wide variety of other possible locations. Essentially, any application is conceivable where a passive optical system is useful: for visual effect; for anywhere that one might need to avoid heat caused by a lamp; anywhere one might need to avoid sparks caused by an electrical circuit.

While the use of optical fibers is specifically contemplated hereinabove, analogously functioning materials may of course be substituted. For instance, Bridgestone produces a Luxaura™ PMMA thermoplastic rod which can be cut to length and used in the same manner as side-lit fibers as discussed hereinabove. This rod, like all light guides, operates on the principle of Total Internal Reflection (TIR), having a core, and a cladding with a lower index of refraction. It also has a co-extruded light-extracting reflector. Another alternative material would be translucent acrylic sheets as often used in the signage industry for shallow back-lit signs; the "Prismex™" product of Lucite International is a good example.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the, scope or spirit of the invention.

What is claimed is:

1. An apparatus for providing illumination, said apparatus comprising:
    a primary illumination element, wherein said primary illumination element comprises a side-lit fiber optic fiber; and
    a light provision conduit connected to said primary illumination element, wherein said light provision conduit further comprises an end-lit fiber optic fiber therein;
    said end-lit fiber optic fiber acting to propagate light towards said primary illumination element via a terminal block connecting an end of said end-lit fiber optic fiber and said side-lit fiber optic fiber;
    said primary illumination element being disposed in accordance with a predetermined pattern;
    said primary illumination element acting to provide illumination in directions outwardly from the predetermined pattern.

2. The apparatus according to claim 1, further comprising:
    a mounting element which holds said primary illumination element;
    said mounting element comprising wall portions disposed in accordance with the predetermined pattern of said primary illumination element.

3. The apparatus according to claim 2, wherein said mounting element comprises a channel letter can.

4. The apparatus according to claim 1, wherein said primary illumination element comprises a thermoplastic rod.

5. The apparatus according to claim 1, wherein said primary illumination element is formed from an acrylic sheet material.

6. The apparatus according to claim 1, further comprising a connection element which interconnects said primary illumination element and said light provision conduit.

7. The apparatus according to claim 6, wherein said connection element is formed from a translucent material.

8. The apparatus according to claim 6, wherein said connection element provides an interference fit with respect to at least one of said primary illumination element and said light provision conduit.

9. The apparatus according to claim 6, wherein said connection element provides a form fit with respect to at least one of said primary illumination element and said light provision conduit.

10. The apparatus according to claim 1, wherein:
    said primary illumination element comprises a first end and a second end;
    said light provision conduit connecting with said primary illumination element at said first end of said primary illumination element.

11. The apparatus according to claim 10, further comprising a reflection medium disposed at said second end of said primary illumination element, said reflection medium acting to reflect back through said primary illumination element light which has travelled from said light provision conduit through said primary illumination element.

12. The apparatus according to claim 10, further comprising a second light provision conduit which connects to said second end of said primary illumination element.

13. The apparatus according to claim 12, further comprising a second light engine which provides light to said second light provision conduit.

14. The apparatus according to claim 1, wherein:
    said primary illumination element is a first primary illumination element;
    said apparatus further comprises a second primary illumination element disposed adjacent to said first primary illumination element, said first and second primary illumination elements aggregately being disposed in accordance with a predetermined aggregate pattern.

15. The apparatus according to claim 14, further comprising a second light provision conduit connecting with said second primary illumination element.

16. The apparatus according to claim 1, wherein:
    said primary illumination element is disposed along an axis which defines the predetermined pattern;
    said primary illumination element acting to provide illumination in directions radially outwardly with respect to the axis defining the predetermined pattern.

* * * * *